United States Patent [19]
Jakob et al.

[11] Patent Number: 4,854,186
[45] Date of Patent: Aug. 8, 1989

[54] APPARATUS FOR ADJUSTING THE LENGTH OF A BOWDEN CABLE

[75] Inventors: Willi Jakob, Ehringshausen; Klaus Marscholl, Ehringshausen-Breitenbach, both of Fed. Rep. of Germany

[73] Assignee: Küster & Co. GmbH, Ehringshausen, Fed. Rep. of Germany

[21] Appl. No.: 279,165

[22] Filed: Dec. 2, 1988

[30] Foreign Application Priority Data

Dec. 2, 1987 [DE] Fed. Rep. of Germany ....... 3740776

[51] Int. Cl.⁴ ............................................. F16C 1/22
[52] U.S. Cl. ............................... 74/501.5 R; 74/502.4; 188/196 V; 192/111 A
[58] Field of Search ............ 74/501.5 R, 502.4, 502.6, 74/502.5; 188/196 V, 24.19, 2 D, 79.51, 79.54, 201; 192/111 A

[56] References Cited

U.S. PATENT DOCUMENTS

| | | | |
|---|---|---|---|
| 988,970 | 4/1911 | Bundy | 188/201 |
| 1,274,865 | 8/1918 | Everett | 188/196 V |
| 2,155,012 | 4/1939 | Harwick et al. | 188/201 |
| 3,572,159 | 3/1971 | Tschanz | |
| 3,710,645 | 1/1973 | Bennett | |
| 4,420,988 | 12/1983 | Deligny | 74/501.5 R |
| 4,751,851 | 6/1988 | Deligny et al. | 74/501.5 R |

FOREIGN PATENT DOCUMENTS

| | | | |
|---|---|---|---|
| 48620 | 3/1982 | European Pat. Off. | 74/502.4 |
| 60735 | 9/1982 | European Pat. Off. | 74/502.4 |
| 2014129 | 1/1971 | Fed. Rep. of Germany | |
| 2149278 | 5/1972 | Fed. Rep. of Germany | |

Primary Examiner—Rodney M. Lindsey
Attorney, Agent, or Firm—Gilbert L. Wells

[57] ABSTRACT

An apparatus to adjust the length of the sheath of a bowden cable and capable of transmitting substantial forces. The bowden cable sheath terminates into a sleeve with a stepped outside diameter whereby it can be inserted into a structure fixed housing against the force of a compression spring. The housing contains a set of spacer panes which are spring-loaded and rest on the large diameter of the sleeve and which upon displacement of the sleeve out of the housing sequentially drop on the small sleeve diameter. The dropped panes extend the sheath each time by their thickness and between the sleeve collar and the housing inside wall form the support for the force exerted on the bowden cable. In a special embodiment, the apparatus is equipped with mechanical means accessible from the outside which when actuated will reset the already dropped spacer panes into their initial positions. Another embodiment offers the possibility to reset the spacer panes into their initial positions by shaping the sleeve so asymmetrically that these spacer panes can be returned to their initial positions by a 90° rotation of the sleeve and by displacing this sleeve into the end fitting and rotating back the sleeve. This embodiment is characterized by being close on all sides and denies access to water, dirt, etc.

9 Claims, 6 Drawing Sheets

APPARATUS FOR ADJUSTING THE LENGTH OF A BOWDEN CABLE

BACKGROUND OF THE INVENTION

The present invention is concerned with an apparatus for adjusting the length of the sheath of a bowden cable guiding a cable tensioned between an actuating element and a gearing component to be driven and in particular it applies to the actuation cable for handbrakes of automobiles and similar vehicles.

Such devices are already known, for instance from West German patents 20 14 129 corresponding to U.S. Pat. No. 3,572,159 and 21 39 278 corresponding to U.S. Pat. No. 3,710,645 the disclosures of which are incorporated herein by reference. The devices described in these and other documents to automatically adjust the length of bowden cable sheaths all operate with gears meshing under spring pressure and upon an operationally determined shortening of the bowden cable sheath, they extend it by another spring mounted between a stationary seat and the sheath forcing this sheath further away from the seat, namely extending it, the meshing teeth slipping over each other.

However, devices of this kind are unsuited for bowden cables transmitting substantial forces. In order that satisfactory automatic adjustment be achieved with these known devices, the tooth-depth of the meshing teeth may not be excessive, just as the spring ensuring meshing must not be excessively strong. As a result, a bowden cable so equipped can only transmit minor forces, for instance the relatively small forces transmitted by a gas-pull in automobiles. Where larger forces are concerned, for instance such as must be transmitted by the hand or emergency brake in automobiles (on the average about 200 kg), the comparatively fine toothing cannot withstand the pressure: teeth become deformed, are squeezed etc. If on the other hand, the tooth-depth is made so large that the teeth withstand such high loads, then adjustment no longer is satisfactory.

SUMMARY OF THE INVENTION

The object of the present invention is to provide an apparatus for adjusting the length of a bowden cable which can be inserted also into bowden cables capable of transmitting substantial forces such as bowden cables used in actuating a hand or emergency brake of an automobile.

This object is achieved in an apparatus for adjusting the length of the sheath of a bowden cable, where the sheath guides an inside cable tensioned between an actuation element and a gearing component to be driven, the apparatus comprising a structure fixed housing with an axial bore through which passes the sheath end, further a compression spring mounted between the structure or the housing and the sheath to stress the sheath toward explusion from the axial bore, by employing a set of mutually parallel spacer panes (6, 106a, 106b) resting on the sheath (2, 3, 103) which are displaceable transversely to the sheath axis and which sequentially drop in front of a collar of the sheath end when this sheath end on account of an operationally-caused shortening of the sheath or lengthening of the cable is expelled from the axial bore by the compression spring (5, 105), these spacer panes resting on the one hand against the end wall of the sheath (2, 103) and on the other hand against the housing (4, 104) or the structure (9, 109).

The essential component of the apparatus of the present invention is a set of parallel spacer panes displaceable transversely to the axis of the sheath on which they rest and which upon an operational shortening of the sheath, or lengthening of the cable, sequentially drop in front of the collar of the sheath end.

The initial installation of a bowden cable containing such an apparatus always takes place by associating the sheath end with the spacers, the sheath being inserted a maximum into the housing of the device and therefore all the spacers being seated on the sheath circumference. Only following the first actuation of the bowden cable and upon subsequent further actuations will the spacers sequentially drop in front of the collar of the sheath end.

There is a practical difficulty in using such a bowden cable for instance in automobiles if it has to be removed during its service life and this may take place for instance in a service station. When the ends of the cable are detached from the actuating element and from the gearing component to be driven, the compression spring will force the sheath end out of the housing, with all the spacers then dropping in front of the collar of the sheath end. Upon reinstallation therefore first all the spacers in front of the sheath end must be forced away, i.e., they must be forced back into their initial positions. Accordingly, means must be provided allowing the mechanic to force back the spacer disks so that the bowden cable can be reinstalled in its initial state (=the sheath inserted a maximum into the housing).

BRIEF DESCRIPTION OF THE DRAWING

The appended drawing illustrates the invention by three illustrative embodiments, wherein.

DESCRIPTION OF THE PREFERRED EMBODIMENTS

In FIGS. 1–6, the cable of the bowden cable is designated by 1 and guided in a sheath 2 which consists of a helically wound wire that as a rule is covered inside and out with a layer of plastic. The sheath is plugged into a sleeve 3 which thereby forms the sheath end. The outside diameter of the sleeve 3 is stepped and the sheath therefore evinces a collar 3a.

Figure 1:
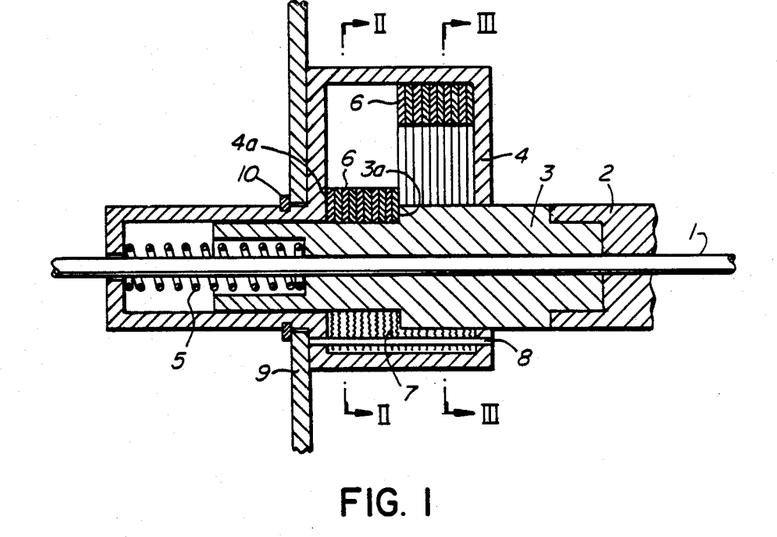
FIG. 1 is a schematic of an apparatus of the present invention with a section of the bowden cable, for a first embodiment.

The sleeve 3 is inserted into the axial bore of a housing 4 and is displaceable longitudinally inside this bore. A compression spring 5 stresses the sleeve 3 together with the sheath 2 as shown in FIG. 1 to the right and toward the outside of the housing 4. This housing 4 is kept in place against a wall 9 by means of a securing ring 10.

Figure 2:
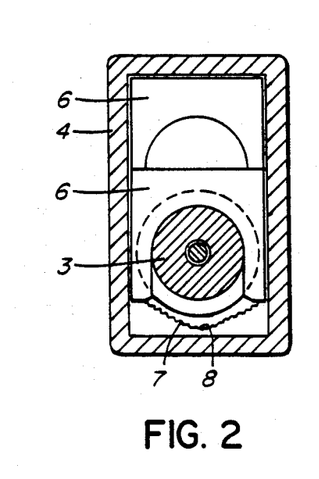
FIG. 2 is a section of FIG. 1 at the sight II—II.
Figure 3:
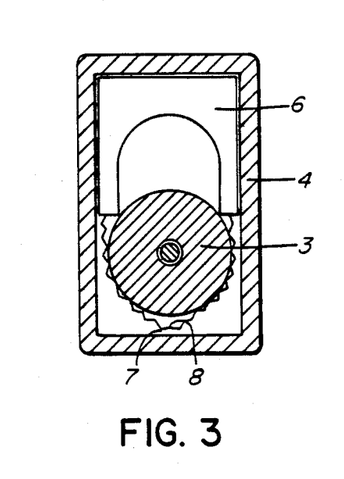
FIG. 3 is a section of FIG. 1 at the sight III—III.

The housing 4 contains a number of mutually parallel spacer panes 6 of which the outer contour is shown in FIGS. 2 and 3. These spacer panes 6 are all the same thickness and for instance are 2 mm thick. Part of them are seated on the larger diameter of the sleeve 3, and part of them have dropped on the smaller diameter of the sleeve 3. Each pane 6 is stressed by a compression spring 7 enclosing a pin 8 in the housing.

Operation is as follows: In the initial phase, for instance when installing the bowden cable, the sheath end, i.e., the sleeve 3, has been displaced all the way to the left (FIG. 1), whereby all the spacer panes 6 are seated on the large diameter of the sleeve 3. After the ends of the cable 1 have been fastened to the actuation element and the gearing component to be driven (omitted), the sheath 2 is released, so that the compression spring 5 now can press the sheath to assume its proper length. Already the first (left) spacer panes 6 are thereby dropping on the small diameter of the sleeve 3.

If now, during operation, the sheath 2 becomes shorter (or if the cable 1 becomes longer, which is equivalent), then the sheath 2 must be extended. This is performed by the compression spring 5 which forces the sleeve 3 out of the housing 4. In the process, the spacer panes 6 sequentially drop on the small diameter of the sleeve 3 and as a whole form the support for the force exerted on the cable. The dropped panes 6 are clamped between the collar 3a and the wall 4a of the housing 4. With a support chosen so large, it is manifest that the cable 1 can transmit substantially larger forces than with similar devices of the state of the art.

Accordingly, the apparatus of the present invention is especially well suited as a length-adjusting means for the handbrake of an automobile. If such a device were absent, the handbrake-cable to lock the car would have to be pulled out, when the vehicle is in new condition, for instance 5 cm. If then after several thousand actuations the sheath has correspondingly settled and possibly in addition the cable has stretched somewhat, then the brake always would have to be pulled ever more in order to achieve against the initial locking, finally as much as 10 or 15 cm, until locking could not be achieved anymore at all and the sheath length would have to be readjusted in the shop using the prior art threaded end-fittings.

This readjustment is avoided by the apparatus of the present invention whereby the length pulled out of the handbrake is practically kept constant because whenever the sheath is shortened by one pane-thickness, the next spacer pane 6 will drop on the sleeve 3 when the brake is released and thus correspondingly lengths the sheath.

Figure 4:
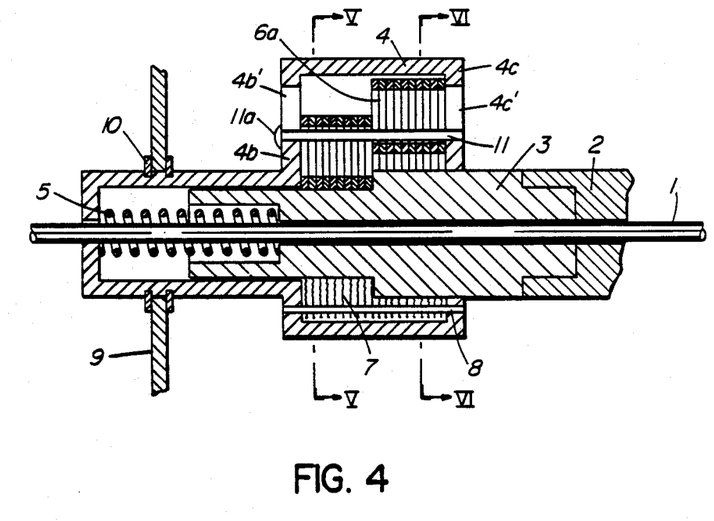
FIG. 4 is an apparatus of the type shown in FIG. 1 but of a second embodiment and equipped with means for resetting the spacer disks.
Figure 5:
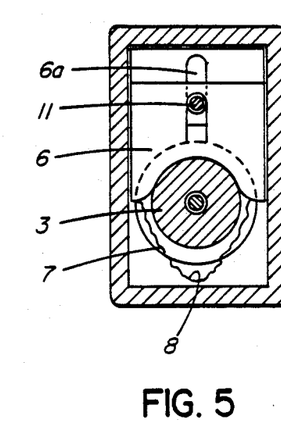
FIG. 5 is a section of FIG. 4 at the sight V—V.
Figure 6:
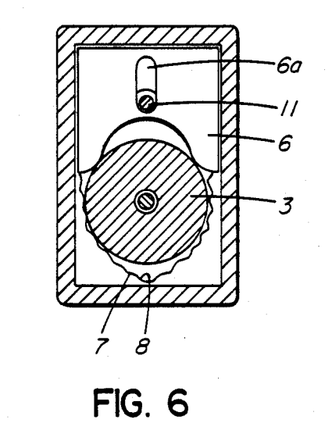
FIG. 6 is a section of FIG. 4 at the sight VI—VI.

FIGS. 4, 5 and 6 show a further development of the apparatus of the present invention wherein the same parts are designated by the same reference numerals. In this embodiment of FIGS. 4, 5 and 6 both the spacer panes 6 and the walls 4b and 4c of the housing 4 are provided with mutually aligned, elongated slots 6a, 4b' and 4c'. A pin 11 passes through these elongated slots and can be seized by means of knobs 11a outside the walls 4b and 4c. This pin 11 is used to reset the already dropped spacer panes into their initial positions.

In FIG. 4, some of the spacer panes 6 already have dropped and thereby the pin 11 was forced into the lower position shown. If starting from the shown position the sleeve 3 is to be displaced for instance by another adjustment of the bowden cable, and again as shown in FIG. 4, against the force of the spring 5, farther to the left, then this shall be possible only when the already dropped spacer panes 6 are raised again and thereby are reset into their initial positions. This can be implemented by seizing the two knobs 11a, for instance by means of the index finger and the thumb, and by raising the pin 11 in the direction of the arrow A, as obvious without further graphic representation.

FIGS. 7–22 show another embodiment of the apparatus of the present invention. This embodiment too allows resetting the spacer panes into their initial positions after they have dropped in part or in whole. However, contrary to the embodiment of FIGS. 4, 5 and 6, this embodiment comprises a housing closed on all sides Thereby the elongated slots 4b' and 4c' are eliminated, which during operation might admit water and dirt into the device.

In these FIGS. 7–22, the cable is designated by 101 and is tensioned between an omitted actuation element and a gearing component which also is omitted. The cable 101 is guided inside a sheath 102 which consists of a helix wound as a continuous structure. The sheath ends in a sleeve 103 and is rigidly joined to this sleeve at 103'.

Figure 7:
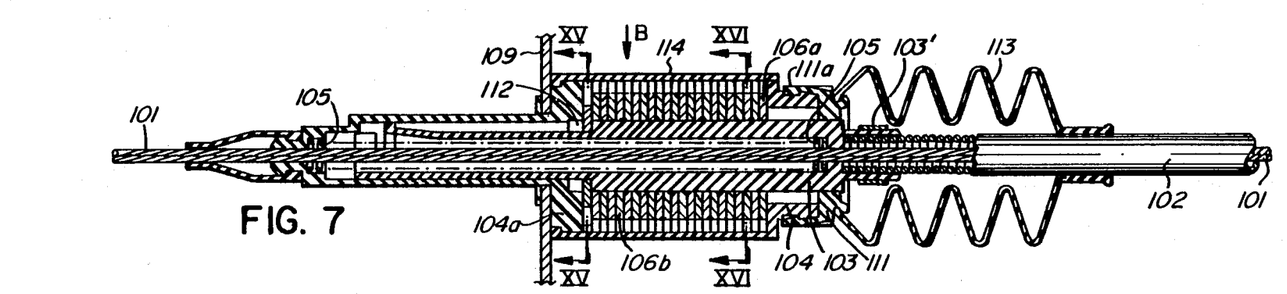
FIG. 7 is an apparatus of the present invention in a third embodiment and also provided with resetting spacer disks, shown in longitudinal section.

The sleeve 103 is plugged into a housing 104 which in turn is kept fixed in a wall 109. A spring 105 is inserted between the housing 104 and the sleeve, 103 and stresses the sleeve 103 towards the outside of the housing 104.

Figures 12, 13, 14, 15, 16, 17, 18:
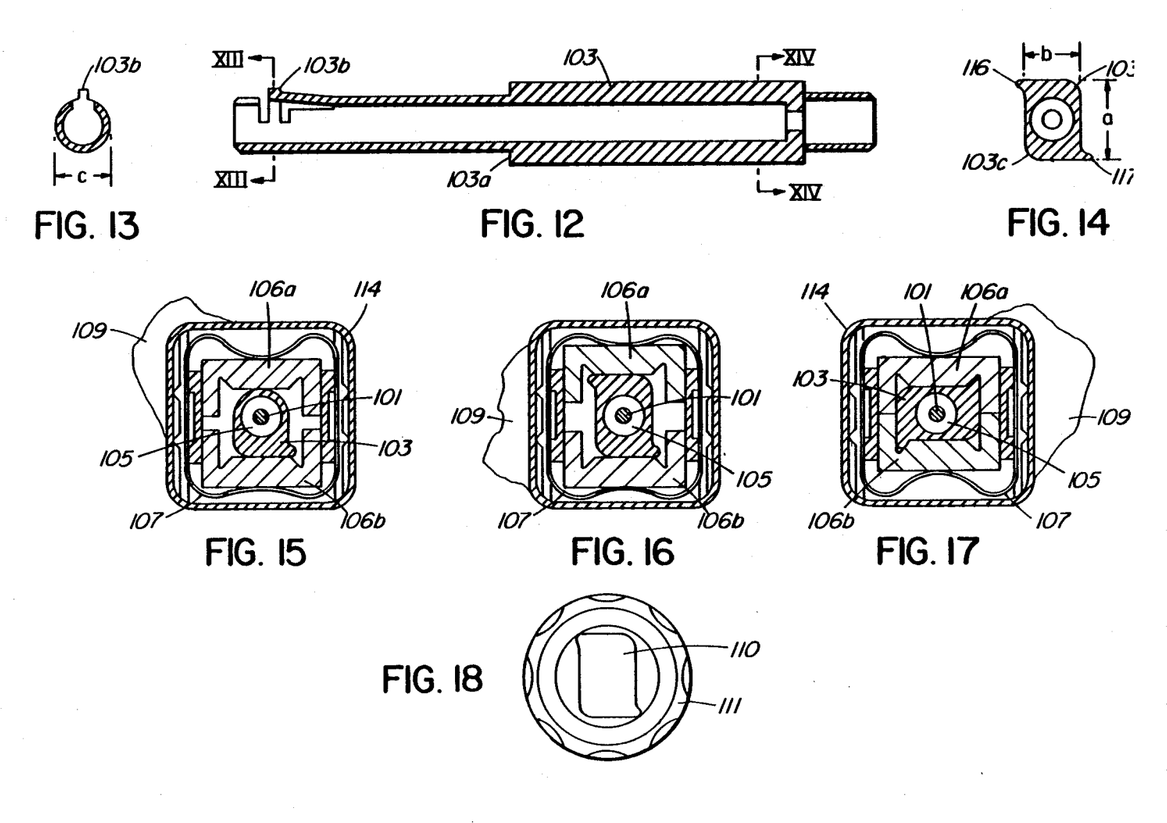
FIG. 12 is a longitudinal section of the sleeve of the sheath end of the third embodiment.
FIG. 13 section of FIG. 12 at the sight XIII—XIII.
FIG. 14 is a section of FIG. 12 at the sight XIV—XIV.
FIG. 15 is a section of FIG. 7 at the sight XV—XV.
FIG. 16 is a section of FIG. 7 at the sight XVI—XVI.
FIG. 17 is a section similar to FIG. 16, however the sleeve is rotated by 90°.
FIG. 18 is the seating cover in front view.
Figure 19:
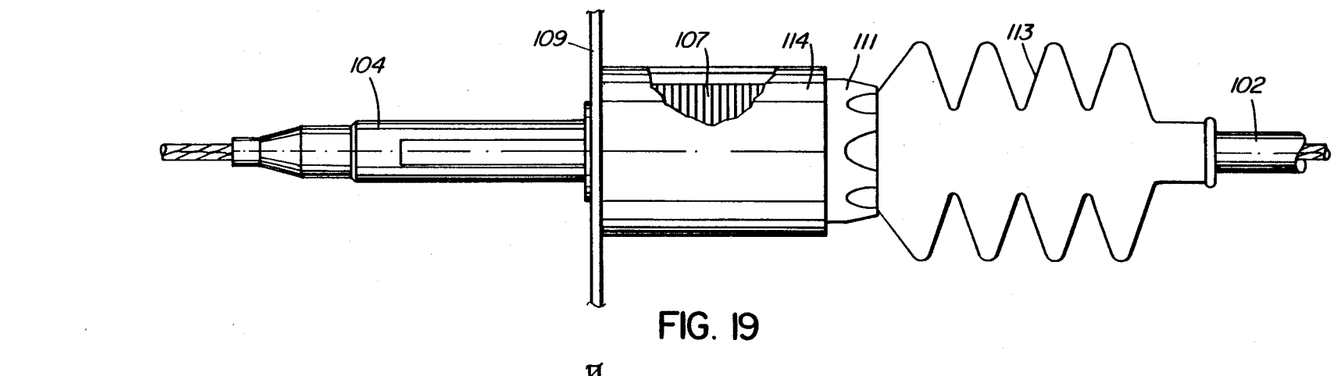
FIG. 19 is a top view of FIG. 7 in the direction B and partly in section.
Figure 20:
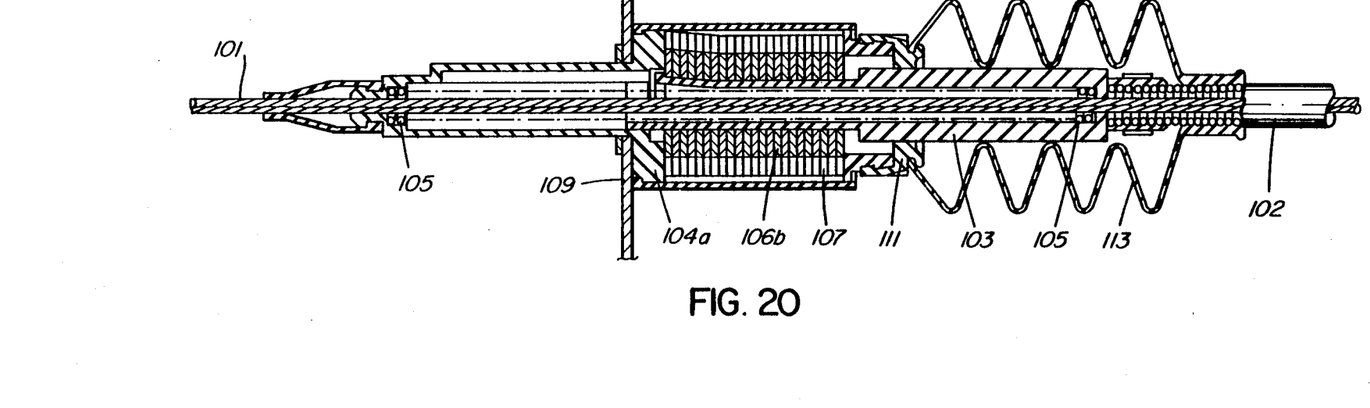
FIG. 20 is an elevation of the apparatus of FIG. 7 in its displaced end position.

The sleeve 103 assumes the shape shown in FIGS. 12, 13 and 14, as especially shown in the left side of FIG. 12 the round outer contour shown in FIG. 13, whereas in the right side it assumes the outer shape shown in FIG. 14. These two cross-sectional shapes abut at 103a where they form a collar. The two parts differ from each other in that the right part has an approximately rectangular cross-section, that is, in one direction its outer dimension "a" is larger and in the other direction the outer dimension "b" is smaller (FIG. 14). In the left part, the cross-section is circular with diameter "c."

A set of spacer panes 106a, 106b is mounted inside the housing 104 in the manner shown in FIG. 7 and they have the shapes shown in FIGS. 15–17. Each pair is enclosed by an elastic ring 107 pressing both spacer panes inward on the sleeve 103.

On the right side of FIG. 7, the housing 104 is sealed by a sealing cover 111 which by means of a bead 111a enters a groove 104b of the housing and which can be rotated inside this groove by 90° to-and-fro. The end positions of this rotation by 90° are set by omitted stops.

FIG. 18 shows an elevation of this sealing cover. The cover at its center comprises a passage 110 in the shape of the cross-section of the sleeve 103 of FIG. 14. The sleeve 103 passes through this passage (FIG. 7).

The housing 104 moreover comprises a recess 112 matching the cross-section of the sleeve 103 of FIG. 14, this recess being present in the somewhat thicker wall 104a of which the purpose will be discussed below.

The individual components described above cooperate as follows: The initial position is that wherein the sleeve 103 is inserted a maximum into the housing 104. In this position, which is not shown, the collar 103a of the sleeve 103 rests against the wall 104a of the housing and all the pairs of spacer panes 106a, 106b rest on the thicker end (outside dimension "a") of the sleeve. Illustratively, this is shown in FIG. 16 and also in the lower part of FIG. 15.

If now the sheath 102 is shortened in operation for instance by a "settling" of the spiral turns, or if the cable 101 becomes longer (this being equivalent as play is introduced into the bowden cable connection), the spring 105 will press the sleeve 103 out of the housing 104; In the process the pairs of spacer panes 106a, 106b sequentially drop off the collar 103a and thereby the play is compensated.

Figure 8:
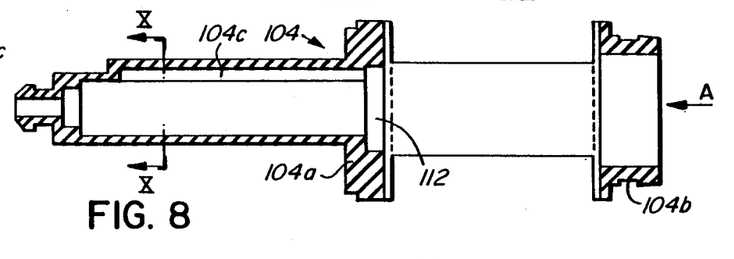
FIGS. 8 and 9 are elevations of the housing of FIG. 7, seen from two directions relative to each other by 90°.
Figure 9:
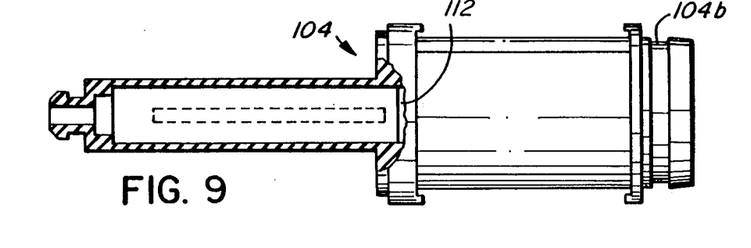
Figure 10:
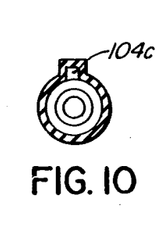
FIG. 10 is a section of FIG. 8 at the sight X—X.
Figure 11:
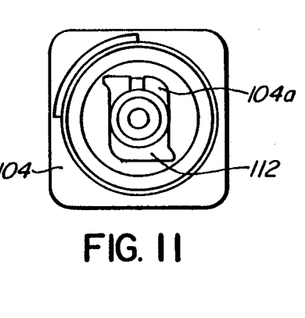
FIG. 11 is an elevation of FIG. 8 seen in the direction A.

The sleeve 103 is guided straight already by the resting pressure of the panes 106a, 106b on it and further by the passage 110 in the sealing cover 111 through which the sleeve is made to pass when being displaced to the right in the representation of FIG. 7. The present embodiment however adds a further rectilinear guidance. It consists of an elastic, projecting stud 103b cut out of the sleeve 103 and guided in the groove 104c of the housing 104 (FIGS. 8 and 9).

The sleeve 103 can be displaced to the right in FIG. 7 until the stud 103b comes to rest against the first spacer pane. The dimensions are selected in such a way that this position is simultaneously that in which the last (right-hand) pair of spacer panes drops before the collar 103a.

This position is not only the case when the sheath 102 has settled by the corresponding length or when the cable 101 has lengthened by the corresponding amount, but also whenever the bowden cable is removed, for instance in the course of repairs or the like. Whenever the sheath or the housing no longer is held between two fixed points (walls), the spring 105 may relax entirely, whereby the sleeve 103 is fully forced out of the housing 104 and arrives at the end position shown in FIG. 20.

In order to reset the device into its initial position, the sleeve must be forced back into the housing 104 against the force of the spring 105. However, this requires further steps because already the pairs of spacer panes 106a, 106b are present in front of the collar 103a blocking the way.

However as regards the embodiment mode of FIGS. 7-22, the sealing cover 111 can be seized at its outer periphery and be rotated by 90°. Simultaneously the sleeve 103 is rotated along because being no longer in the sealing-cover passage 110. Relative to the pairs of spacer panes 106a, 106b the sleeve thereby arrives in a position shown cross-sectionally in FIG. 17. At the same time, the stud 103b is forced back by cam 104a' (FIG. 11) fashioned from the wall 104a onto the circumference "b" which simultaneously is the cross-sectional diameter shown in FIG. 13.

Now when in this position, the sleeve 103 can be moved through the pairs of spacer panes (to the left), for instance by gripping the sheath 102 outside the rubber accordion 113 and by pressing the sheath and the sleeve are pressed against the force of the spring 105 until the collar 103a comes to rest against the wall 104a.

Figure 21:
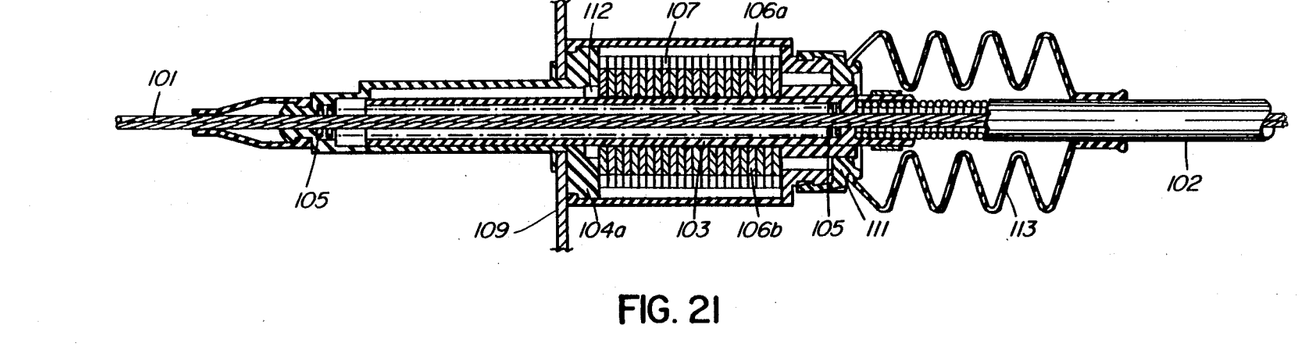
FIG. 21 is a view of the apparatus of FIG. 7 in its reset position.

In that position, the sleeve 103 as shown in the right-hand side of FIG. 21 still engages by the thickness of one spacer pane (about 2 mm) the passage 110 of the sealing cover 111. If now the sealing cover 111 is rotated back those 90° by which it previously was rotated in the other direction, the ends 103c, 103d (FIG. 14 will force apart the pairs of spacer panes 106i a, 106b against the force of the elastic rings 107, whereby all of the device is reset into its initial position.

However, the device must also be kept in that position when the sheath 102 and the housing 104 are not yet installed between two walls or in fixed manner, that is when the bowden cable is free. This means that the sleeve 103 must be secured against the force of the spring 105 in its initial position relative to the housing 104.

The recess 112 in the wall 104a, already mentioned above, is provided for that purpose; as stated, it assumes the shape of the cross-section of the sleeve 103 of FIG. 14. This shape illustratively is so oriented in FIG. 7 that the dimension "a" of FIG. 14 is vertical. However as the sleeve 103 is transverse following the rotation by 90°, the sleeve, as stated above, can be guided back only until the collar 103a comes to rest against the wall 104a. The right-hand end of the sleeve 103, also as already mentioned above, still remains in the passage 110 of the sealing cover 111 (FIG. 21).

Figure 22:
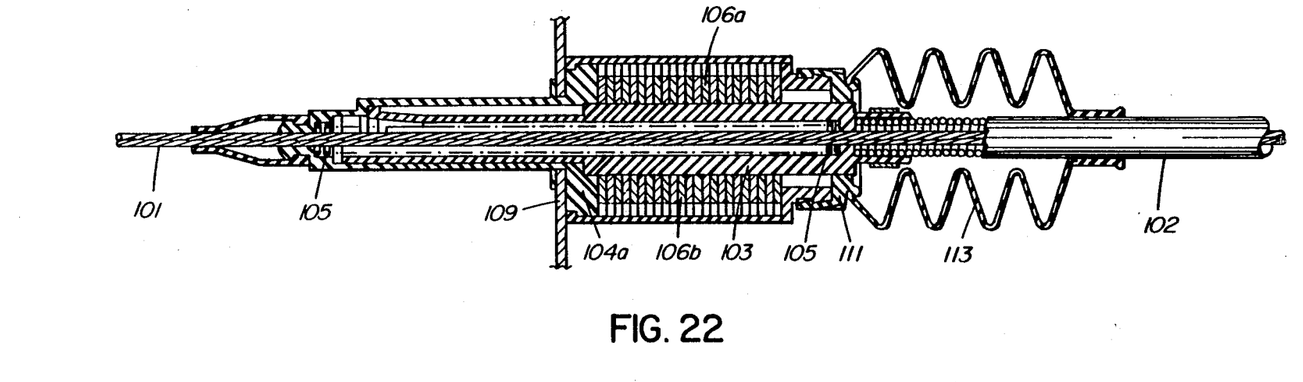
FIG. 22 is a view like that of FIG. 21 but the sleeve has been set back further.

If now however the sealing cover 111 is rotated back by 90° to force apart the pairs of spacer panes 106a, 106b, then the cross-sectional shape of the sleeve 103 will "match" that of the recess 112. Thereby the sleeve 103 can be inserted further into the housing 104 by the depth of the recess 112. As a result the right end of the sleeve 103 shown in FIG. 21 slips out of the sealing cover 111. The sealing cover 111 therefore is released and can be rotated through an arbitrary angle up to 90° into the transverse position of the passage 110. In this position, the shape of the passage 110 no longer "matches" the cross-sectional shape of the sleeve 103. Therefore the sheath may be released and the spring 105 cannot expel the sleeve which is now held by the sealing cover (FIG. 22).

This state of the apparatus is its delivery state in which the bowden cable is furnished to a factory, a shop or the like. The sleeve 103 is fully pressed into the housing 104 and there it is held by the cover 111. At installation, first the housing 104 is fixed into the wall 109 and the other sheath end to another (omitted) wall. Then the two ends of the cable 101 are fastened to the actuation element and to the gearing component to be driven, and lastly the sealing cover 111 is rotated back into that position wherein the passage 110 and the cross-sectional shape of the sleeve 103 are mutually flush.

Thereupon the spring 105 can relax and force the sleeve 103 out of the housing 104 until the entire length of the sheath matches the length of the cable. Provision is made that already the first, second or possibly also the third pair of spacer panes drop in front of the collar 103a. Further dropping of the spacer panes then takes place automatically to adjust the sheath length, as described above.

The housing 104 is enclosed by cladding 114 most clearly shown in FIGS. 15-17 and 19-22. The entire housing is covered by this cladding, whereby the pairs of spacer panes 106a, 106b are made safe against any water spray, dirt and the like.

Lastly be it noted that the sleeve 103 is provided at its right side (FIG. 12) and in cross-section (FIG. 14) with triangular projections 116, 117 at its diametrically opposite corners. These projections are inoperative as regards the resetting of the pairs of spacer panes and the sleeve 103. They are merely present to enlarge the surface of the collar 103a and thereby to reduce the pressure applied to the spacer panes 106a, 106b. In particular these corners do not take part in resetting the spacer panes 106a, 106b into their initial positions. As described, this reset operation is implemented by the corners 103c, 103d alone.

We claim:

1. An apparatus for adjusting the length of a sheath of a bowden having a sheath axis, said sheath guiding therein a cable of the bowden cable for tensioning between an actuation element and a gearing component to be driven, said apparatus comprising a structure fixed housing having an axial bore through which passes an end of said sheath, a compression spring mounted between said housing and said sheath stressing said sheath toward expulsion from said axial bore, a set of mutually parallel spacer panes (6, 106a, 106b) resting in initial positions on said sheath (2, 103) which are displaceable transversely to said sheath axis and which sequentially drop in front of a collar on said end of said sheath when said end of said sheath on account of an operationally-caused shortening of the sheath or lengthening of the cable is being expelled from said axial bore by said compression spring (5, 105), said spacer panes then resting on the one hand against said collar of said sheath (2, 103) and on the other hand against said housing (4, 104).

2. The apparatus of claim 1, wherein one spring component (7, 107) is provided for each spacer pane (6, 106a, 106b) which forces every individual pane in the direction of said sheath axis.

3. The apparatus of claim 1, wherein said end of said sheath is formed by a sleeve (3, 103) reduced in a portion of its outer circumference and forming said collar (3a, 103a) at a transition between large and small diameters, as a result of the reduction.

4. The apparatus of claim 1, wherein said spacer panes (6, 106a, 106b) rest in said housing (4, 104) and in that outside said housing (4, 104) additional mechanical means (11, 111) are provided which when actuated reset said spacer panes into their initial positions.

5. The apparatus of claim 4, wherein said spacer panes (6) comprise mutually aligned elongated slots (6a) and said housing has front and rear walls (4b; 4c) each also containing a correspondingly aligned elongated slot (4b'; 4c') and said mechanical means consist of a pin (11) passing through said elongated slots of said spacer panes and said housing (4b'; 4c'; 6a), which can be seized from the outside at said front and rear walls so that dropped spacer panes (6) are resettable into their initial positions by lifting said pin (11).

6. The apparatus of claim 3, further comprising:
 (a) said sleeve (103) having a front half defining said small diameter a comprising a circular cross-section, and a rear half defining said large diameter a cross-section with outwardly projecting edges (103c, 103d);
 (b) said sleeve (103) rotatable by 90° about a longitudinal axis between an operational position and a reset position;
 (c) each of said spacer panes (106a, 106b) provided with a recess which forms a passage with all other dropped spacer panes through which said sleeve (103) with said outwardly projecting edges (103c, 103d) when in the reset position can be returned against the force of said compression spring (105) into an initial position;
 (d) a sealing cover (111) on said housing (104) at a side facing said bowden cable sheath and comprising a passage (110) with a contour matching said cross-section of said rear half of said sleeve (103) whereby said sleeve is displaceable within said passage (110);
 (e) said sealing cover (111) on said housing (104) being rotatable between two end positions by said 90° corresponding to angular rotation of said sleeve (103) between said operational and reset positions; and
 (f) upon said sleeve (103) returned into its initial position, said outwardly projecting edge (103c; 103d) defining a lifting mechanism when resetting said sleeve (103) into its operational position to reset all spacer panes (106a, 106b) into their initial positions.

7. The apparatus of claim 6, wherein said spacer panes are pairs of spacer panes (106a, 106b) and in that each pair is mounted symmetrically about said sleeve (103) in a plane perpendicular to said sleeve (103).

8. The apparatus of claim 7, wherein each pair of said spacer panes is enclosed by an elastic ring (107) pressing both pairs of spacer panes (106a, 106b) inward against said sleeve.

9. The apparatus of claim 8, wherein said housing (104) comprises a wall (104a) having a recess (112) which can be entered by said sleeve (103) when in its operational position by the collar (103a) until said sleeve (103) slips out of said passage (110) of said sealing cover (111), whereby said sealing cover can be rotated relative to said sleeve and said sleeve is secured in an inserted position.

* * * * *